United States Patent [19]

Faul

[11] Patent Number: 4,683,674

[45] Date of Patent: Aug. 4, 1987

[54] COMPOST BIN

[75] Inventor: Thomas L. Faul, Washago, Canada

[73] Assignee: Barclay Horticulture Mfg. Ltd., Downsview, Canada

[21] Appl. No.: 798,281

[22] Filed: Nov. 15, 1985

[51] Int. Cl.[4] .................. A01G 9/02; E04G 11/04
[52] U.S. Cl. .................................. 47/83; 52/169.5; 52/245
[58] Field of Search .................................. 47/82–83; 52/245, 169.5

[56] References Cited

U.S. PATENT DOCUMENTS

3,137,095 6/1964 Pearson .................................. 47/83
4,060,945 12/1977 Wilson .............................. 52/245 X
4,161,085 7/1979 Moffett .................................. 47/82

Primary Examiner—Robert E. Bagwill

[57] ABSTRACT

According to the present invention, a panel for use in a garden compost bin or garden planter is taught which allows convenient horizontal or vertical connection of like panels to collectively form the container. The panel is shaped to enhance the structural strength thereof and reduce the tendency of the panel to deflect under load. The panel is nestable in other like panels to permit dense packaging and essentially requires no modification for defining containers of different diameter. The particular structure of the panel allows an interior portion thereof to be cut from the body of the panel to allow hinging of that portion out of the plane of the panel for accessing the interior of the container or for providing support for plants etc., when it is used as a planter.

21 Claims, 18 Drawing Figures

COMPOST BIN

BACKGROUND OF THE INVENTION

Compost bins and vertical planters for domestic use are well known and particularly popular in European countries.

One compost bin marketed by Rotocrop Corp. uses a number of vertically slidable panels having a bead on one edge of the panel and a corresponding slot in the other edge which allows connection of adjacent panels and permit vertical sliding of one panel relative to the other. Therefore, according to this structure, a compost bin of panels is known, and the number of panels will determine the final diameter of the container. In order to access the bottom of the compost bin, one of the panels is moved upwardly whereby the compost can be removed adjacent the base of the container.

Another compost bin is marketed by Barclay Rothschild Manufacturing Ltd. and sold under the SOIL-SAVER trade mark. This structure is basically rectangular with each side being an injected molded panel with the panels connected at the interior of the container by the end user. At least one of these panels has a separately removable access door for removing compost from the base of the container.

The above referred to compost bins generally represent a cross-section of the type of product being offered in the marketplace.

There remains a need to provide a garden receptacle, planter or compost bin of high structural rigidity which is capable of expansion to greater capacity by adding more panels either to increase the diameter of the container or the height of the container.

According to the present invention, a compost bin is possible which is vertically and horizontally modularly expandable, with the panels cooperating when joined to increase the structural strength of the resulting container. This product is capable of being used either as a garden receptacle, a vertical planter, a compost bin, or the like.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
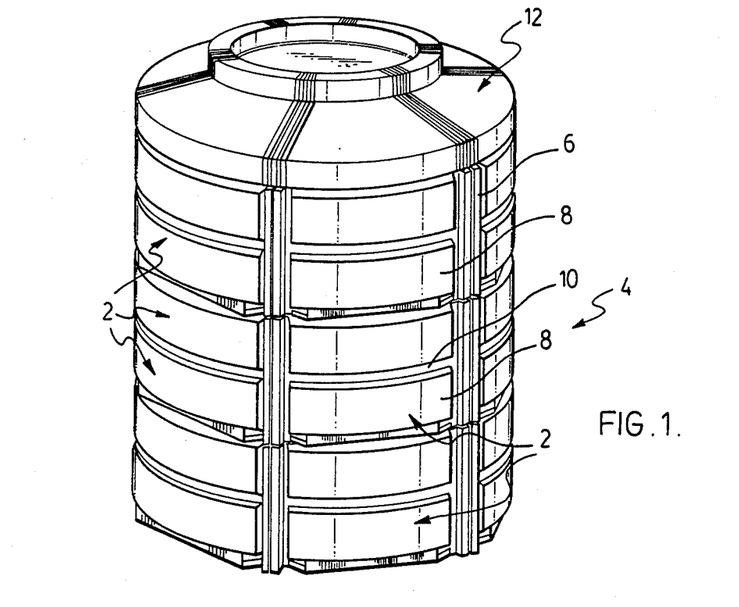
FIG. 1 is a perspective view of the gardening container.
Figure 2:
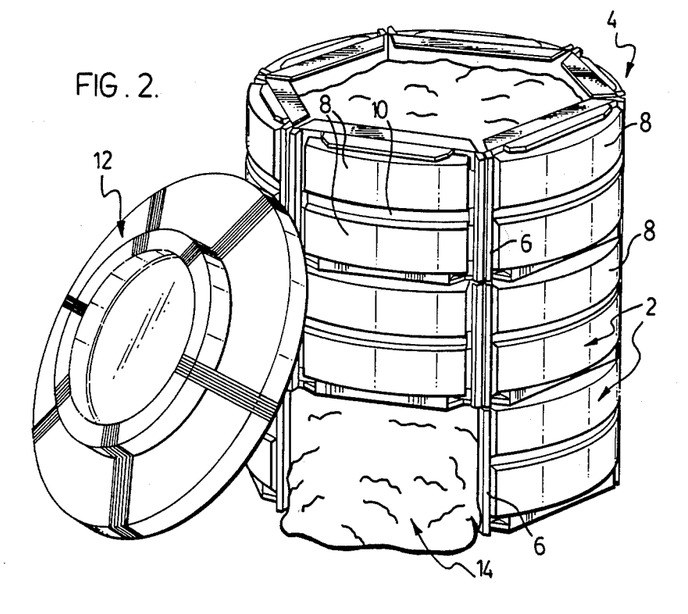
FIG. 2 is a perspective view of the gardening container having a lower portion removed.
Figure 3:
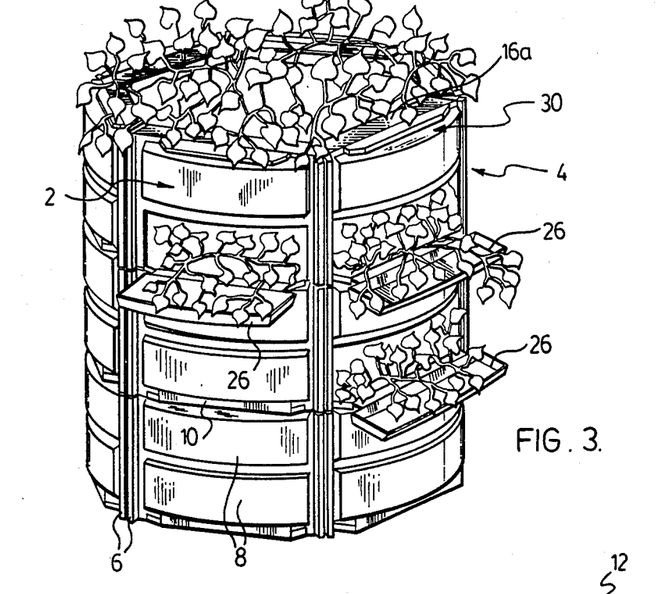
FIG. 3 is a perspective view of the container when used as a planter.
Figure 4:
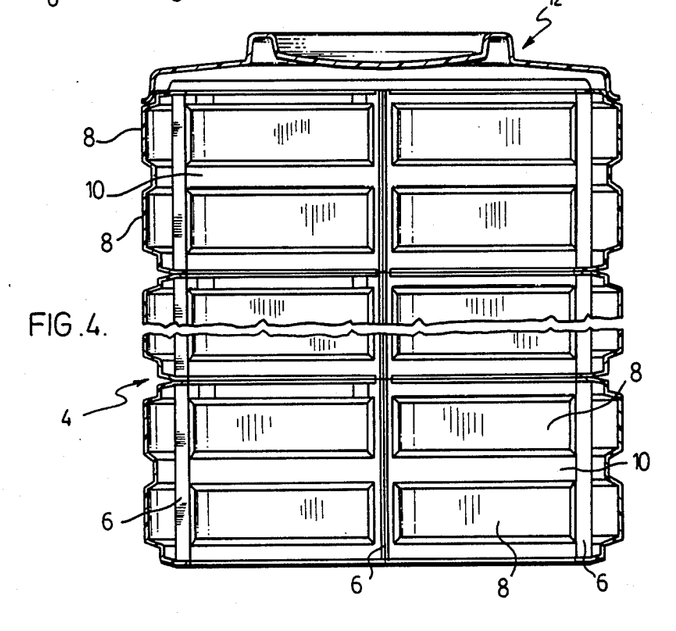
FIG. 4 is a vertical sectional view through the container.
Figures 15, 16:
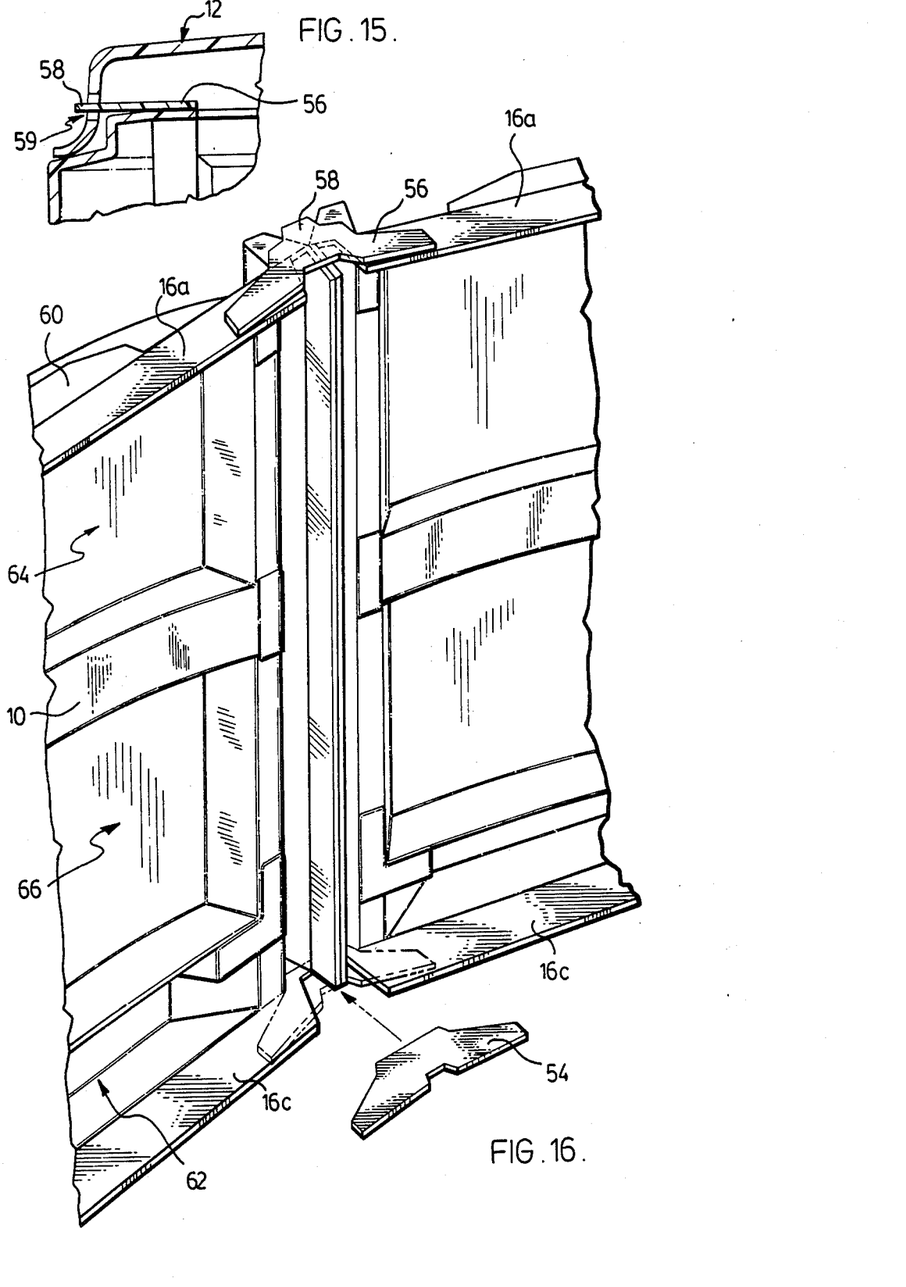
FIG. 15 is a partial sectional view showing securement of the lid to the upper tier of panels.
FIG. 16 is a partial perspective view showing additional gusset members used to secure horizontal edge adjacent panels.

The gardening-type receptacle generally shown as 4 in FIG. 1 comprises a plurality of identical panels 2 which are vertically and horizontally interconnected to form the receptacle 4. Each panel 2 includes vertical channels 6, either side thereof which protrude outwardly from the panel and provide vertical reinforcing. These channels are open to the interior side of the panel as generally shown in FIG. 16. The channels are closed at either end thereof. Each panel also includes two horizontal pockets or recesses 8, separated by a recessed horizontally extending rib 10. Pockets 8 are curved outwardly to provide horizontal reinforcing and give the panel substantial three dimensional depth. The extent to which these pockets 8 extend outwardly from the panel can be appreciated from considering the top views of FIGS. 17 and 18.

The container also has an optional lid 12 which is secured at the top the container as generally shown in FIG. 1.

The lid is preferrably injection molded of a plastic material in several sections. This allows the end user to assemble the lid with the components thereof of a size suitable for packaging with the panels. All sections of the lid are the same with flanges at the edge of the sections for joining by use of snap connectors. For example, these flanges can have aligned holes for receiving a male connector of the type shown integrally molded with the panels.

Figure 5:
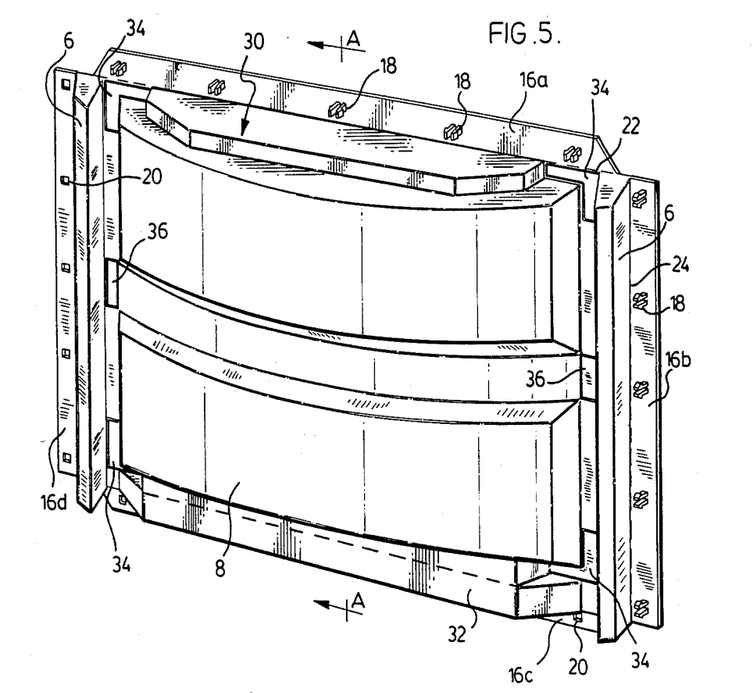
FIG. 5 is a perspective view of one panel used in forming of the container.
Figure 6:
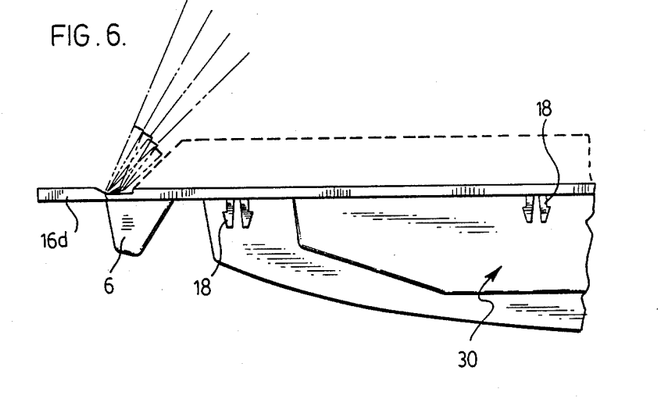
FIG. 6 is a top view showing various positions of the vertical hinge edge of a panel.
Figure 9:
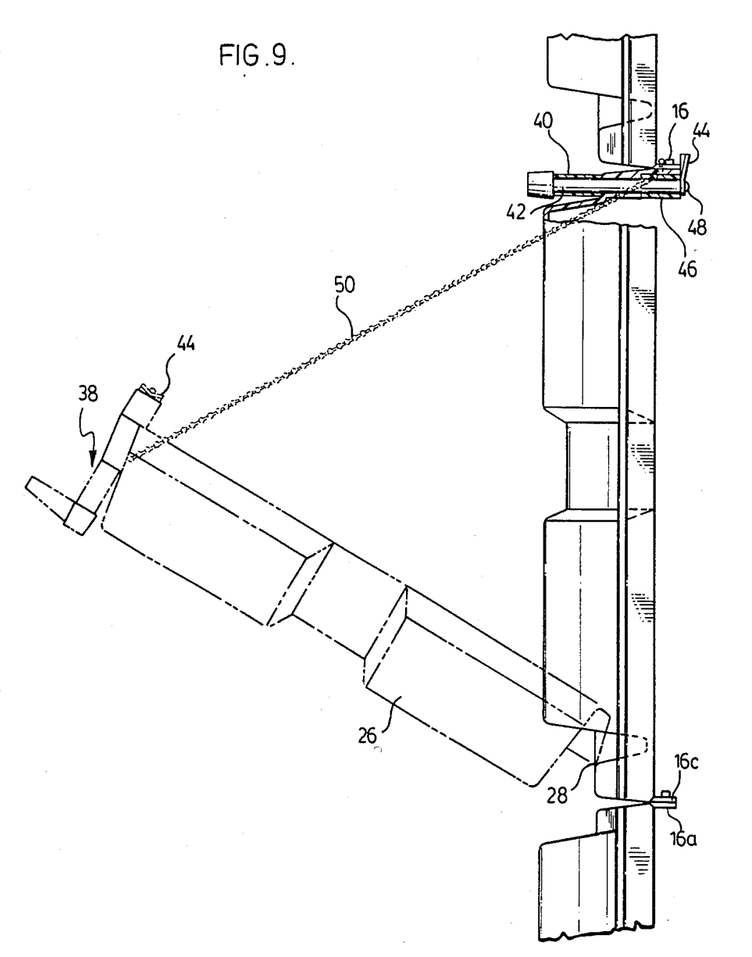
FIG. 9 shows the hinging of one panel outwardly for accessing the interior of the container or for providing additional support area when used as a planter.
Figure 10:
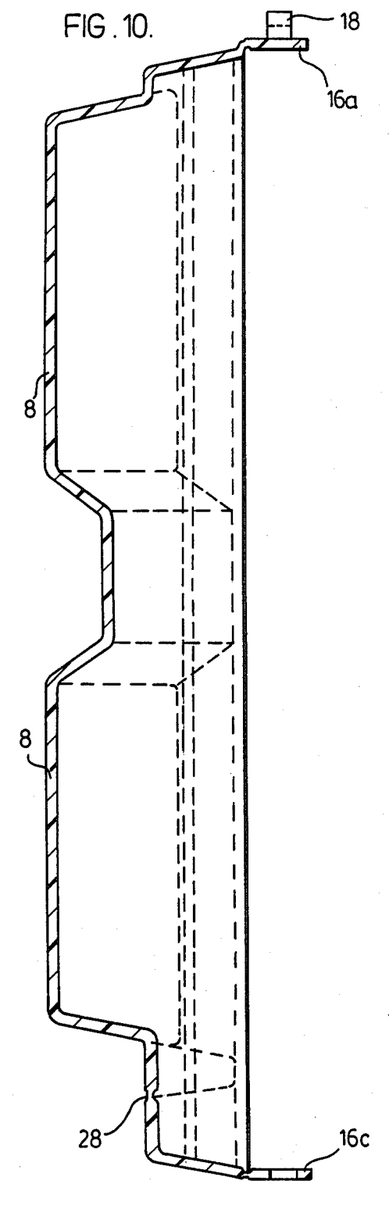
FIG. 10 is the sectional view taken along line A—A of FIG. 5.
Figure 11:
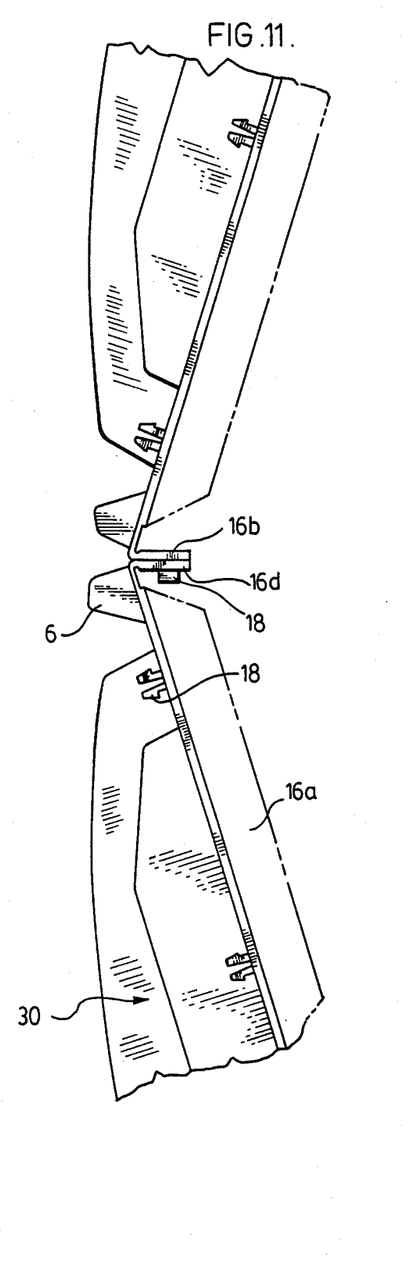
FIG. 11 is a top view of two secured panels.
Figure 17:
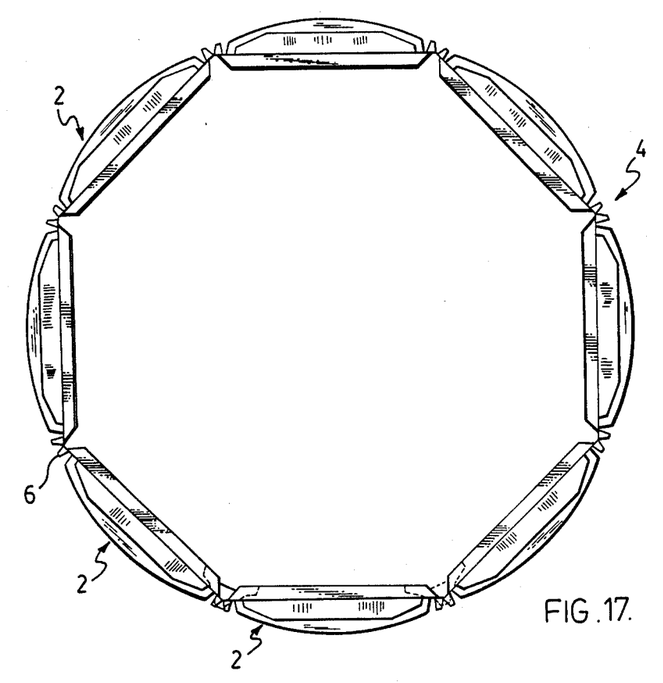
FIG. 17 shows a container having a diameter determined by the joining of eight panels.
Figure 18:
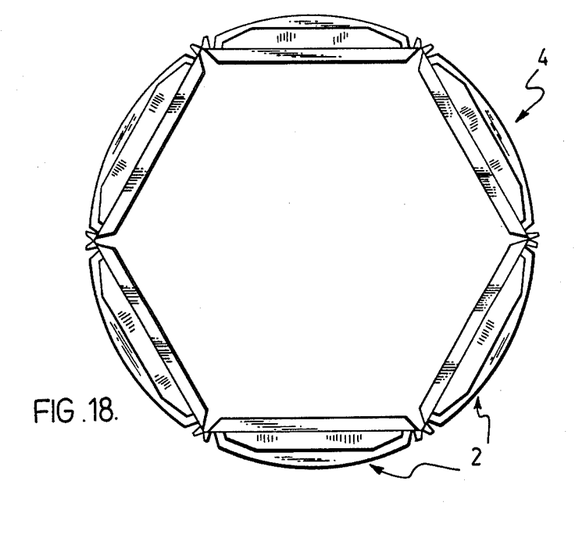
FIG. 18 shows a container having a diameter resulting from six joined panels.

Each panel includes weakened regions within the edge of the panel along which the pockets 8 are cut on the vertical edges thereof and across the top of the upper most pocket to allow hinging of this portion outwardly from the panel as generally shown in FIG. 9. This results in a hinged access door 26 pivotable about hinge line 28. Details of the individual panels can be appreciated from FIG. 5 and 6 where it can be seen that along each edge of the generally rectangular shaped panel 2, is a integral hinged edge strip identified as 16a, 16b, 16c and 16d. Hinged edge strip 16a and 16b have been provided with male connectors 18 spaced in the length of these members which cooperate with corresponding female components 20 located in edges 16c and 16d of what would be corresponding panels. Each of the hinged edge strips 16 can be bent about a hinge line joining the strip to the panel such as hinge line 22 or 24, whereby these edge strips provide either horizontal reinforcing or vertical reinforcing when secured with an edge of an adjacent panel. The edge strips 16 act as horizontal and vertical struts or bracing for the panel. As shown in FIG. 6, the junction of the hinge strip 16d and the vertical channel 6 has been thinned to allow the pivoting of hinge strip 16d relative to the panel as generally indicated by the broken lines. The various angles shown allow joining of the panels in one of a host of different positions for forming containers of different diameters as generally shown in FIGS. 17 and 18. The horizontal hinge edge strips 16a and 16c are similarly joined to the panel to permit the hinging thereof into a generally horizontal plane.

Figure 12:
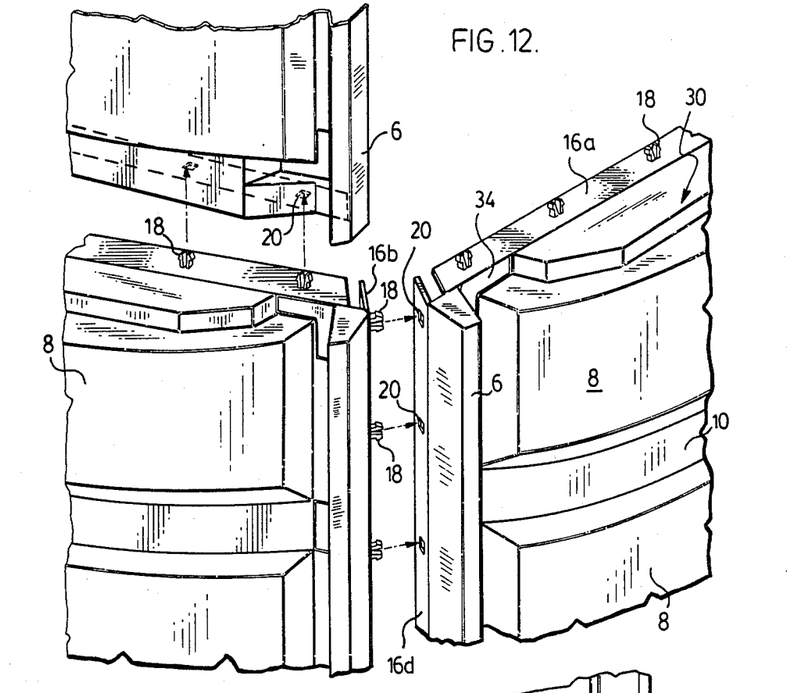
FIG. 12 is a partial perspective view showing the cooperation between joined panels which stiffens the resulting container.
Figure 13:
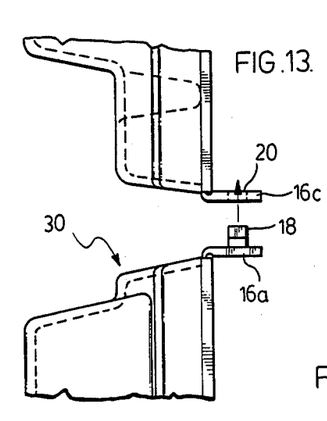
FIG. 13 and 14 show the joining of two stacked panels.
Figure 14:
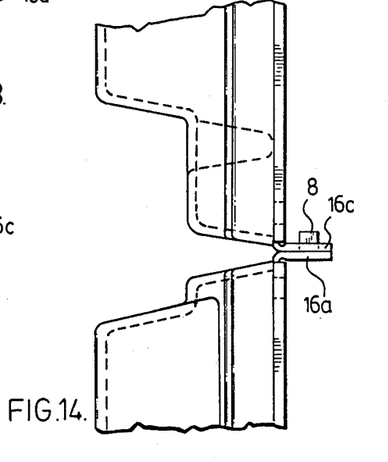

Securement of horizontally adjacent panels and vertically adjacent panels can be appreciated from FIGS. 12, 13 and 14 where the male connectors 18 are received in corresponding female parts 20, connectors 20 are forced through the female component and provide a snap fit once forced therethrough to maintain the connection. The angulation between horizontally adjacent panels is provided by the hinged junction of these strips to each panel thereby allowing containers of different diameters.

Returning to FIG. 5, it can be seen above the upper horizontal pocket 8, further reinforcing is provided by the step-like configuration 30 of the panel 2, which basically provides further reinforcing in a plane intermediate the pocket and the plane of the hinged edge 16a. Also below the lower pocket 8 of the panel further reinforcing intermediate the depth of the pocket and hinged strip 16c is provided by the outwardly stepped area 32, which extends generally across the panel intermediate the vertical channels 6. Each panel also includes "L" shaped knock-out members 34 and intermediate knock-out members 36 which are used when the container is used as compost bin to allow air to freely pass into the container.

Figure 7:
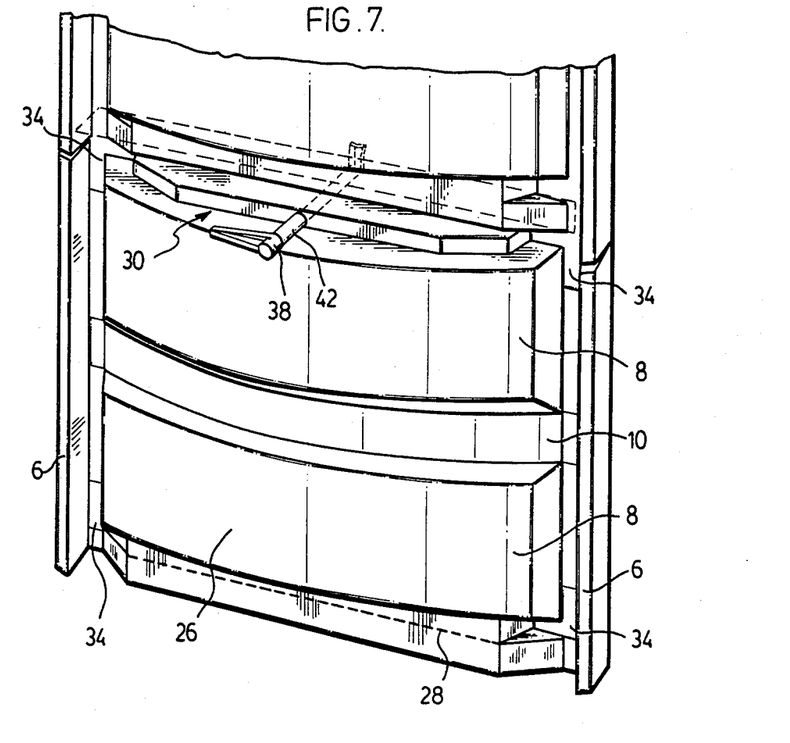
FIG. 7 is a perspective view of two stacked panels, the lower one of which has been provided with a handle for allowing a portion thereof to be opened.
Figure 8:
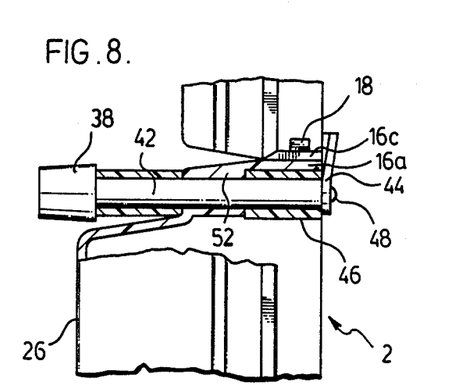
FIG. 8 is a partial sectional view through the handle showing the method of securing the same.

FIGS. 7, 8 and 9 illustrate the method in which a panel may be modified to provide access to the interior of the container. As shown in FIG. 9, hinged access door 26 includes a handle generally shown as 38 having a spacer 40, a shank portion 42, a latching portion 44 secured to the shank by screw 48. In addition, an interior collar 46 is provided. The latch 44 is secured to the shank 42 by screw 48. If necessary, a ball and chain-type arrangement 50 may be provided which is secured to one of the hinged edges 16 and to the access door 26 thereby limit the extent of downward pivoting movement of the access door 26. The spacer 42 positions the handle outwardly of the panel a predetermined distance and the interior collar 46 engages the opposite end of the shank 42. This collar is held by latch member 44 such that the handle is generally fixed in position relative to the access door 26 and is pivotal to disengage or engage latch 44 at the rear of the hinged edge strips 16. This provides a simple inexpensive handle where the shank portion 42 passes through a somewhat thickened portion 52 of the panel 2, generally shown in FIG. 8. The access door 26 has been cut from the interior of the panel along the vertical edges of the access door and across the top thereof to allow pivoting about the hinge line 28 shown in FIG. 9.

As can be appreciated from FIGS. 10, 13, 14 and 16, the panel has a plurality of different spaced planes to provide both horizontal and vertical reinforcing. These planes allow the panel to be of reduced thickness and therefore the amount of high impact polypropylene plastic suitable for outdoor use is reduced while maintaining the amount of deflection of the panel under load within acceptable limits. This particular profile and reinforcing reduces the extent of deflection while providing an aesthetically pleasing exterior shape.

Further horizontal rigidity of the container can be accomplished by use of gusset members 54 and 56 shown in FIG. 16. These gussets bridge the junction between two horizontally adjacent panels and if desired could be made integrally with the panels. Gusset 56 is secured to the hinged edge 16a of each panel and can be attached thereto in a manner similar to the male/female-type connectors shown in FIG. 5. Gusset member 54 is secured between the two lower hinge edges 16c, when gussets are provided between all horizontally adjacent panels you effectively have a continuous ring at the top and bottom of all horizontally joined panels which significantly improves the final structural integrity of the container. Gusset member 56 has projection 58, and preferably would only be used at the upper edge of the container as the projection 58 is adapted to cooperate with an aperture 59 in the container lid 12 to pass therethrough and provide positive locking of the lid to the container as generally shown in FIG. 15.

The pockets 8 which extend outwardly of the panel are preferably shaped as shown in FIG. 16 to define an interior box-like shape 64 and 66 separated by the channel 10. These recessed regions each border onto an outwardly stepped region 60 or 62 adjacent the upper and lower edge of the panel.

From the foregoing description, it can be appreciated that it is possible to produce a dual purpose-type gardening container which can be used as a compost structure or as a vertical planter from a single set of identical panels. The panels all have hingable edges to form vertical reinforcing and horizontal reinforcing and in so doing provide overlapping horizontal and vertical surfaces used to secure adjacent panel. Each of the hinged edge strips 16 have a thin portion to permit bending thereof out of the plane of the panel. The panels snap together both vertically and horizontally by use of male connectors 18 preferably integrally molded with the panels and female receptacles 20. The panels can be shipped in a dense packing state, as one panel will nest within the other. The panels are somewhat curved and include a number of transition planes to provide horizontal and vertical reinforcing. In addition, each panel is adapted to allow at least partial separation of a portion thereof to provide direct access to the container or to allow that portion to form a door hinged about the lower edge. This structure is suitable for use as a compost bin or as a vertical planter without changing the panels and merely adding or deleting certain minor components.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A panel for use with like panels for forming a gardening-type planter, receptacle or the like, said panel being integrally formed of a plastic material and of a generally rectangular shape, each edge of said panel having a hinged edge strip movable out of the plane of said panel towards the interior of said panel for overlapping and connecting with the edges of adjacent panels to be secured, each edge being adapted for connection with an abutting edge of an adjacent panel, said edges when hinged out of the plane of said panel providing vertical or horizontal reinforcing of said panel to stiffen said panel and reduce deflection of said panel under load and cooperating with secured adjacent panels to stiffen the resulting planter, receptacle or the like.

2. A panel as claimed in claim 1, including opposed reinforcing channels each disposed inwardly of and parallel to each vertical edge of said panel and extending substantially the length of said edge, each channel being closed at either and thereof with said channel open to the interior of said panel.

3. A panel as claimed in claim 2, wherein said panel includes, outwardly stepped regions adjacent each horizontal edge strip.

4. A panel as claimed in claim 3, including a protruding horizontal curved rectangular-like region intermediate the edges of said panel which is generally framed by said vertical channels and said stepped regions.

5. A panel as claimed in claim 4, wherein said protruding horizontal curved region is centrally interrupted by a horizontal extending indented member providing additional horizontal reinforcing of said panel.

6. A panel as claimed in claim 4, wherein intermediate said vertical channels and intermediate said stepped profile at the upper edge of said panel a weakened region is provided to facilitate cutting of said protruding curved region on three sides thereof for hinging adjacent a lower horizontal edge of said curved region.

7. A panel as claimed in claim 2, wherein said channels taper inwardly from the interior of the panel to allow nesting of one panel in another panel.

8. A panel as claimed in claim 1, including a number of inwardly tapered pockets open to the interior of the panel which stiffen the panel with respect to deflection, and permit nesting of one panel in another for shipping.

9. A panel as claimed in claim 8, wherein said panel includes two vertical channel recesses adjacent the vertical sides of the panel and two horizontal pockets across intermediate the vertical channels each of which are bowed outwardly to provide a curved front portion, said horizontal pockets being separated by a recessed rib member.

10. A panel as claimed in claim 9, including a weakened region to either side of said horizontal pockets and intermediate the upper horizontal pocket and the upper edge of the panel to allow hinging of said horizontal pockets out of the plane of the panel adjacent a lower junction of the lower horizontal pocket and the panel.

11. A garden planter, receptacle or the like structure suitable for composting or as a vertical planter comprising a plurality of connected like molded plastic panels which form the sidewalls of the structure, each panel being generally rectangular in elevation and a portion thereof intermediate edges of said panel being horizontally curved and displaced outwardly, each panel including separate horizontal and vertical edge connecting regions hinged out of the plane of said panel and extending into the structure, horizontally adjacent panels being connected by paired overlapping vertical edge regions between said panels with said panels held in abutting contact by securing means associated with said edge regions, said edge regions reinforcing said molded panel by providing horizontal and vertical stiffening struts.

12. A garden planter receptacle or the like structure as claimed in claim 11, wherein each panel includes opposed reinforcing channels each disposed inwardly of, parallel to, and adjacent a vertical edge connecting region of said panel and extending substantially the length of said edge connecting region, each channel being closed at either and thereof with said channel open to the interior of said panel.

13. A garden planter, receptacle or the like structure as claimed in claim 12, wherein each panel includes, outwardly stepped regions adjacent to and interior of each horizontal edge connection region.

14. A garden planter, receptacle or the like structure as claimed in claim 13, wherein each panel includes a protruding horizontal curved rectangular-like region intermediate the edge connecting regions which is generally framed by said vertical channels and said stepped regions.

15. A garden planter, receptacle or the like structure as claimed in claim 14, wherein said protruding horizontal curved region of each panel is centrally interrupted by a horizontal extending indented member providing additional horizontal reinforcing of said panel.

16. A garden planter, receptacle or the like structure as claimed in claim 14, wherein intermediate said vertical channels and intermediate said stepped profile at an upper edge of each panel a weakened region is provided to facilitate cutting of said protruding curved region on three sides thereof for hinging adjacent a lower horizontal edge of said curved region.

17. A garden planter, receptacle or the like structure as claimed in claim 12, wherein said channels of each panel taper inwardly from the interior of the panel to allow nesting of one panel in another panel for shipping in a non connected state.

18. A garden planter, receptacle or the like structure as claimed in claim 11, including a number of inwardly tapered pockets open to the interior of each panel which stiffen the panel with respect to deflection, and permit nesting of one panel in another for shipping.

19. A garden planter, receptacle or the like structure as claimed in claim 18, wherein each panel includes two vertical channels adjacent vertical sides of the panel and two horizontal pockets extending intermediate the vertical channels each of which are bowed outwardly to provide a curved front portion, said horizontal pockets being separated by a recessed rib.

20. A garden planter, receptacle or the like structure as claimed in claim 19, including a weakened region to either side of said horizontal pockets and intermediate the upper horizontal pocket and a upper edge of each panel to allow hinging of said horizontal pockets out of the plane of the panel adjacent a lower junction of the lower horizontal pocket and the panel.

21. A garden planter, receptacle or the like structure as claimed in claim 11, wherein a sufficient number of panels are vertically stacked and horizontally connected to uniformly increase the height of the structure and wherein said vertically stacked panels are connected to lower panels by means of overlapping horizontal edge connecting regions between vertically adjacent panels and including securing means associated with said overlapping horizontal edge connecting regions maintaining the same in abutting relationship.

* * * * *